(12) United States Patent
Hermes et al.

(10) Patent No.: US 8,057,116 B1
(45) Date of Patent: Nov. 15, 2011

(54) DATA INPUT MECHANISM

(75) Inventors: Jihad Hermes, Herndon, VA (US);
Praduman D. Jain, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 457 days.

(21) Appl. No.: 11/501,868

(22) Filed: Aug. 10, 2006

(51) Int. Cl.
*B41J 15/00* (2006.01)
*G06F 3/023* (2006.01)

(52) U.S. Cl. ........................................ 400/489; 400/472

(58) Field of Classification Search .................. 400/489, 400/472; 361/680; 345/168; 341/22
See application file for complete search history.

(56) References Cited

U.S. PATENT DOCUMENTS

| | | | | |
|---|---|---|---|---|
| 5,187,644 A | * | 2/1993 | Crisan | 361/679.16 |
| 5,528,235 A | * | 6/1996 | Lin et al. | 341/22 |
| 5,841,374 A | * | 11/1998 | Abraham | 341/34 |
| 6,042,478 A | * | 3/2000 | Ng | 463/44 |
| 6,396,006 B1 | * | 5/2002 | Yokoji et al. | 200/4 |
| 6,567,074 B2 | * | 5/2003 | Numata et al. | 345/169 |
| 6,744,427 B2 | * | 6/2004 | Maglio et al. | 345/172 |
| 7,091,430 B1 | * | 8/2006 | Haizima et al. | 200/6 A |
| 7,170,497 B2 | * | 1/2007 | Husgafvel et al. | 345/172 |
| 7,378,991 B2 | * | 5/2008 | Dietz et al. | 341/22 |
| 2005/0168566 A1 | * | 8/2005 | Tada et al. | 348/14.01 |
| 2007/0126702 A1 | * | 6/2007 | Griffin et al. | 345/168 |

* cited by examiner

*Primary Examiner* — Daniel J Colilla
*Assistant Examiner* — Marissa Ferguson Samreth

(57) ABSTRACT

A user interface with a keypad having a reduced form factor is provided. The keypad includes a plurality of multi-position keys, each of which has a plurality of toggle positions for making a plurality of data selections. The user interface may also include a plurality of function keys and a screen for displaying the data. The user interface reduces the number of keys needed on a keypad and minimizes the number of finger movements, thereby reducing the number of errors made when using the user interface.

20 Claims, 4 Drawing Sheets

DATA INPUT MECHANISM

BACKGROUND OF THE INVENTION

The present invention relates to a user interface. More specifically, the present invention relates to a user interface including a keypad for minimizing finger movements.

QWERTY keypads and keyboards are known for use in laptops and large keyboards for computers. However, the QWERTY keypad layout is not appropriate for space-constrained mobile and handheld devices, because QWERTY keypad layouts require an excessive number of keys to achieve their functionality.

Current keypads for mobile and handheld devices are too small for many users, because the keys are too small and too close together to avoid numerous typing errors. This problem is sometimes called a "fat finger" problem. Also, current keypads require the use of a large of a number of keys, which reduces the potential efficiency of using the keypad. Sometimes users have to use a stylus or other small object to be able to push the correct keys without inadvertently pushing other keys when using the keypad. This unnecessarily complicates the use of handheld devices.

SUMMARY OF THE INVENTION

The present invention provides a user interface with a keypad having a reduced form factor with a small number of keys (e.g., multi-position keys and function keys). Each of the multi-position keys may have a plurality of toggle positions for making a plurality of selections of alphabetical and/or numeric characters and/or functions, etc. By having fewer keys, the speed of use of the keypad can be increased and the number of errors can be decreased. Further, the amount of finger movements can be reduced, thereby simplifying the use of the keypad.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
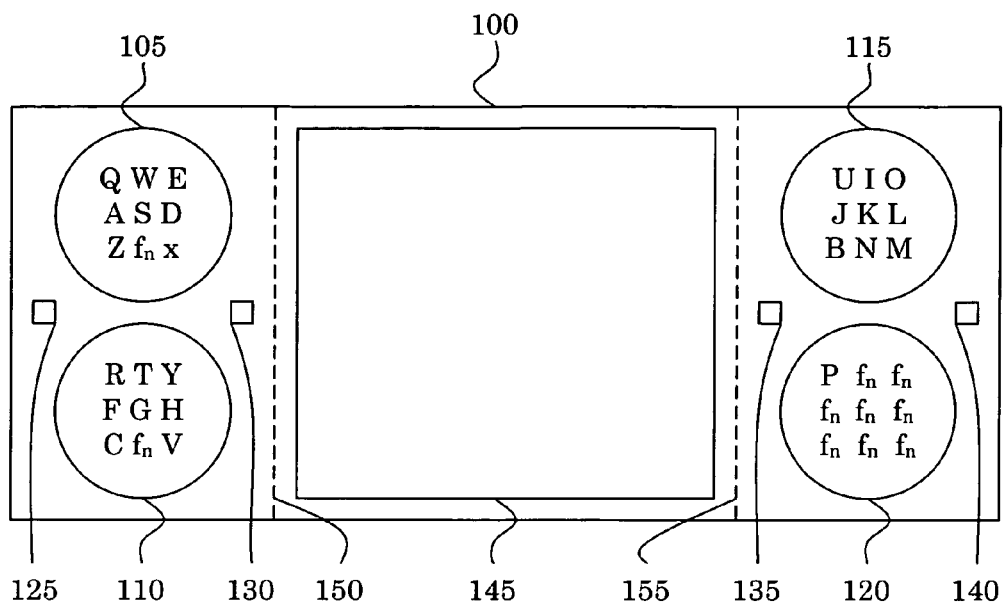
FIG. 1 illustrates an exemplary embodiment of a user interface, in accordance with the present invention.

FIG. 1 illustrates an exemplary embodiment of a user interface, in accordance with the present invention. As illustrated in FIG. 1, a user interface 100 may include a plurality of multi-position keys 105, 110, 115 and 120, whose movement is similar to that of a joy stick (as described below). Each of the multi-position keys may have a plurality of toggle positions. Multi-position key 105, for example, has nine toggle positions, each of which corresponds to each of the letters Q, W, E, A, S, D, Z and X and function $f_n$. The toggle position for letter S may be reached by pressing the multi-position key in the vertical direction, i.e., in a direction substantially perpendicular to the face of the multi-position key, similar to depression of a button. The toggle positions for the remaining letters and function $f_n$ may be reached by moving the multi-position key in the horizontal direction from the center of the multi-position key toward the corresponding letter or by tilting the multi-position key from the center in the direction toward the corresponding letter.

The function $f_n$ may be any of a plurality of predetermined functions, e.g., space, delete, return, shift, back space, forward, any of a plurality of special characters, etc. As illustrated in FIG. 1, the characters on the plurality of multi-position keys may be arranged in a manner that corresponds to the traditional layout of a computer keyboard. Additionally, although not explicitly illustrated in FIG. 1, the multi-position keys 105, 110, 115 and 120 may be configured to rotate clockwise and/or counterclockwise to provide additional functionality. For example, the multi-position keys can be rotated to provide volume control for an application of the user interface.

Figure 2:
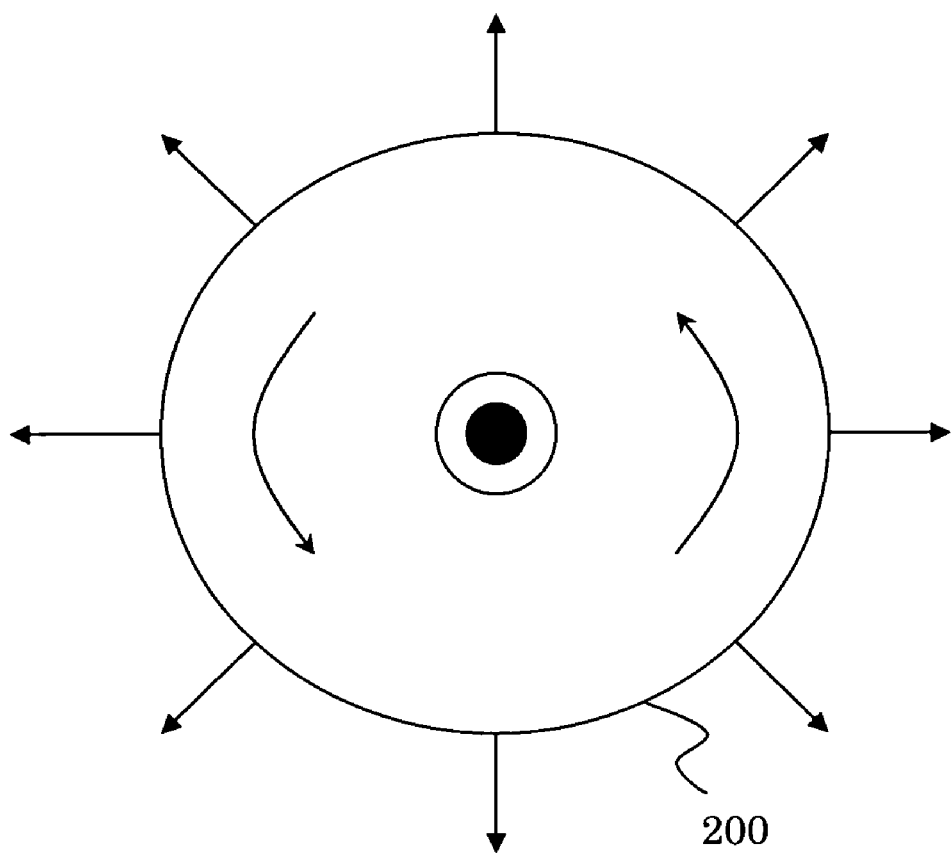
FIG. 2 illustrates an exemplary embodiment of a multi-position key having a plurality of toggle directions, in accordance with the present invention.

FIG. 2 illustrates an exemplary embodiment of a multi-position key having a plurality of toggle directions, in accordance with the present invention. As illustrated, the multi-position key 200 has nine toggle positions, as indicated by the arrows projecting outward from the circumference of the multi-position key 200 and by the circle in the center of the multi-position key 200. The toggle positions indicated by the arrows are reached by moving the multi-position key 200 in the directions of the arrows that are substantially perpendicular to the outside circumference of the multi-position key. The toggle position indicated by the circle in the center of the multi-position key 200 may be reached by pressing the multi-position key in a vertical direction. As illustrated in FIG. 2, the multi-position key 200 may also be rotated clockwise and/or counterclockwise.

In an exemplary embodiment of the multi-position key 200, the diameter of the multi-position key may be about one inch. Other diameters, both larger and smaller than one inch, are contemplated as well, depending upon the particular use for the user interface on which the multi-position key 200 is located.

As illustrated in FIG. 1, the user interface 100 may also include a plurality of function keys 125, 130, 135 and 140. The function keys may be used to perform a variety of functions pertinent to the particular type of device on which the user interface is disposed. For example, the user device may be a cellular telephone, a personal digital assistant (PDA), computer, etc. The function keys 125, 130, 135 and 140 may be used alone or in combination with the multi-position keys 105, 110, 115 and 120. For example, function key 125 could be used as a "shift" key. By pressing function key 125 while selecting a letter with the multi-position key 115, a lower (or upper) case letter can be selected instead of the upper (or lower) case letter selected by the multi-position key 115. The shift function is merely an example of the plurality of functions that can be performed with the function keys. Any other function associated with the use of a keypad and/or keyboard for entering and/or selecting data with a cellular telephone, PDA, handheld gaming device, messaging device, computer, etc. may also be used.

The user interface 100 may further include a display screen 145. The display screen 145 may display characters entered by a user via the multi-position keys 105, 110, 115 and 120 and/or function keys 125, 130, 135 and 140, which are disposed on either side of the display screen 145. The display screen 145 may also display menus and submenus that may be navigated by the user via the multi-position keys 105, 110, 115 and 120 and/or function keys 125, 130, 135 and 140.

Also, the user interface 100 may include hinges 150 and 155 for allowing the user to adjust the arrangement of the multi-position keys 105, 110, 115 and 120 and/or function keys 125, 130, 135 and 140 relative to the display screen 145. Using the hinges 150 and/or 155 may be particularly useful for user interfaces for gaming and messaging applications, for example.

Figure 3:
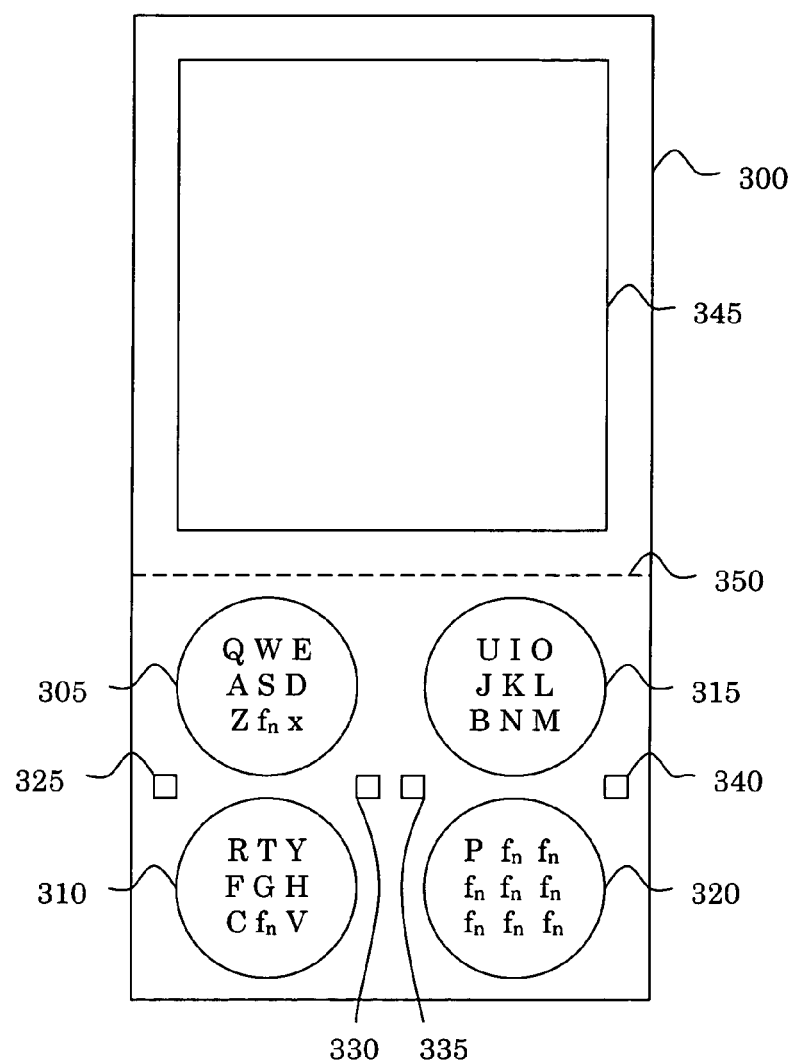
FIG. 3 illustrates another exemplary embodiment of a user interface, in accordance with the present invention.

FIG. 3 illustrates another exemplary embodiment of a user interface, in accordance with the present invention. The user interface 300 includes multi-position keys 305, 310, 315 and 320, function keys 325, 330, 335 and 340, a display screen 345 and a hinge 350. The operation of the various parts of the user interface 300 corresponds to the operation of the various parts of the user interface 100 described above in relation to FIG. 1, and thus that discussion is not repeated here. As illustrated in FIG. 3, the multi-position keys 305, 310, 315 and 320 and function keys 325, 330, 335 and 340 are disposed below the display screen 345. However, the display screen could be disposed above the multi-position keys 305, 310, 315 and 320 and function keys 325, 330, 335 and 340 or in any other desired arrangement.

Figure 4:
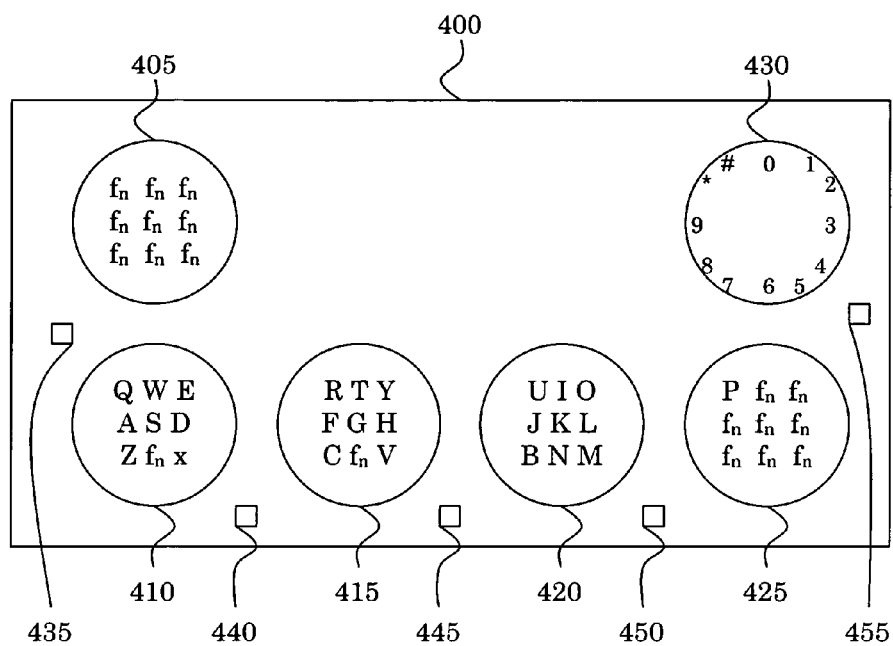
FIG. 4 illustrates an exemplary embodiment of a user interface keyboard, in accordance with the present invention.

FIG. 4 illustrates an exemplary embodiment of a user interface keyboard, in accordance with the present invention. The user interface keyboard 400 may include a plurality of multi-position keys 405, 410, 415, 420, 425 and 430 and a plurality of function keys 435, 440, 445, 450 and 455. Each of the multi-position keys 405, 410, 415, 420, 425 and 430 may have a plurality of toggle positions, as described above in relation to FIGS. 1-3. Multi-position key 430, for example, may include at least 12 toggle positions, each of which corresponds to one of numbers 0-9 and characters "*" and "#." In addition to using multi-position key 430 of FIG. 4 as a multi-position key on a keyboard, multi-position key 430 could be used on a telephone also, as a number entry key for telephone numbers, etc. The other individual multi-position keys and function keys illustrated in FIG. 4 can operate in the manner described above.

The keyboard illustrated in FIG. 4 could be used in place of a conventional computer keyboard, for example. By having fewer keys than a conventional computer keyboard, however, the size of the keyboard could be reduced, as well as the number of finger movements and the number of keyboard errors, thereby saving space and improving the functioning of the keyboard.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A user interface comprising:
a plurality of multi-position keys, each of which comprises a plurality of toggle positions for making a plurality of selections for inputting or selecting data in an electronic device;
a screen for displaying the data;
a first hinge disposed on a left side of the screen; and
a second hinge disposed on a right side of the screen;
wherein a first group of the plurality of multi-position keys is disposed to the left of the first hinge and a second group of the plurality of multi-position keys is disposed to the right of the second hinge;
wherein each of the multi-position keys is configured to rotate in clockwise and counterclockwise directions, the rotations providing control for an application of the user interface, to move vertically, and to move laterally outward from a center of each of the multi-position keys;
wherein each of a first group of the plurality of toggle positions is selected by a lateral movement outward from the center of each of the multi-position keys and each of a second group of the plurality of toggle positions is selected by a vertical movement of each of the plurality of multi-position keys.

2. The user interface of claim 1, wherein the first and second hinges are configured to adjust a spatial relationship between the screen and the plurality of multi-position keys.

3. The user interface of claim 1, further comprising: a plurality of function keys configured to be used separately from the plurality of multi-position keys or in conjunction with the plurality of multi-position keys.

4. The user interface of claim 1, wherein each of the multi-position keys further comprises a predetermined function.

5. The user interface of claim 1, wherein each of the toggle positions corresponds to an alphabetic character or a predetermined function.

6. The user interface of claim 1, wherein each of the multi-position keys is disposed at a corner of the screen.

7. The user interface of claim 1, wherein the plurality of multi-position keys is disposed in a telephone.

8. The user interface of claim 1, wherein the plurality of multi-position keys is disposed in a handheld gaming device.

9. The user interface of claim 1, wherein the plurality of multi-position keys is disposed in a PDA.

10. The user interface of claim 1, wherein the toggle positions are disposed at even angles around the multi-position keys.

11. A user interface for a computer, comprising:
a keyboard comprising a plurality of multi-position keys, each of which comprises a plurality of toggle positions for making a plurality of selections to enable a user to input data into the computer;
a screen for displaying the data;
a first hinge disposed on a left side of the screen; and
a second hinge disposed on a right side of the screen;
wherein a first group of the plurality of multi-position keys is disposed to the left of the first hinge and a second group of the plurality of multi-position keys is disposed to the right of the second hinge;
wherein each of the multi-position keys is configured to rotate in clockwise and counterclockwise directions, the rotations providing control for an application of the user interface, to move vertically, and to move laterally outward from a center of each of the multi-position keys;
wherein each of a first group of the plurality of toggle positions is selected by a lateral movement outward from the center of each of the multi-position keys and each of a second group of the plurality of toggle positions is selected by a vertical movement of each of the plurality of multi-position keys.

12. The user interface of claim 11, further comprising: a plurality of function keys configured to be used separately from the plurality of multi-position keys or in conjunction with the plurality of multi-position keys.

13. The user interface of claim 11, wherein each of the toggle positions corresponds to an alphabetic character or a predetermined function.

14. The user interface of claim 11, wherein the toggle positions are disposed at even angles around the multi-position keys.

15. The user interface of claim 1, wherein each of the multi-position keys has a diameter of less than one inch.

16. The user interface of claim 1, wherein each of the multi-position keys has nine toggle positions.

17. The user interface of claim 1, wherein each of the multi-position keys has nine or twelve toggle positions.

18. The user interface of claim 11, wherein each of the multi-position keys has a diameter of less than one inch.

19. The user interface of claim 11, wherein each of the multi-position keys has nine toggle positions.

20. The user interface of claim 11, wherein each of the multi-position keys has nine or twelve toggle positions.

\* \* \* \* \*